Figure 1:
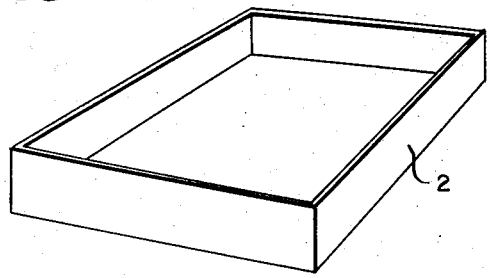

Oct. 7, 1958 W. C. RAINER ET AL 2,855,517

IRRADIATION TREATMENT OF POLYETHYLENE

Filed July 20, 1955

INVENTORS
WILLIAM C. RAINER
EDWARD M. REDDING
ARTHUR W. SLOAN
WILLIAM D. STEWART
JOSEPH J. HITOV
BY
Cushman, Darby & Cushman
ATTORNEYS

2,855,517

IRRADIATION TREATMENT OF POLYETHYLENE

William C. Rainer, Edward M. Redding, and Joseph J. Hitov, Baltimore, Md., and Arthur W. Sloan and William D. Stewart, Alexandria, Va., assignors, by mesne assignments, to W. R. Grace & Co., Cambridge, Mass., a corporation of Connecticut Application July 20, 1955, Serial No. 523,316

12 Claims. (Cl. 250—51)

The present invention relates to polyethylene of improved clarity or transparency, which polyethylene has been irradiated.

Polyethylene is widely used today in making containers, e. g., squeeze bottles, toys, film packaging materials, etc. Despite its many advantages in these and other uses, it suffers from the disadvantage that it is normally translucent rather than transparent in appearance at room temperature and, hence, cannot be used in applications where a clear, water-white material is desired.

It is known that solid polyethylene can be physically transformed into a clear, transparent plastic or liquid, when elevated to its transition point, which is approximately 105° to 125° C. However, this transparency is normally lost upon cooling, unless special methods are employed, and, even with such special methods, the transparency is not retained if the polymer is reheated and slowly cooled. The transition point of polyethylene is commonly referred to as its transparent or softening point. There also is some variation in transition point, depending on the average molecular weight of the polymer. With a molecular weight of about 20,000, the transition point is generally about 110° C.

In the past, it has been proposed to make transparent polyethylene film by heating polyethylene and then quick cooling the same to room temperature or below. Alternatively, it has been suggested to obtain transparency by stretching the polyethylene. These procedures, while giving transparent polyethylene, suffer from the disadvantage that this transparency is not retained if the polyethylene is submitted, for example, to further physical changes, such as heating and slow cooling and, it has not proven feasible to retain the clarity during subsequent shaping operations.

Accordingly, it is a primary object of the invention to prepare a polyethylene which remains clear and transparent, e. g., water-white, regardless of change in physical form. For example, films of of such clear and transparent polyethylene can, by irradiation, if the irradiation is not carried out to too great an extent, be heated to at least its clear point, molded into desired shape and then cooled to form a new product which retains the clarity and transparency of the original film.

It is a further object of the invention to prepare a polyethylene which can be molded by conventional compression and blow molding procedures to obtain a clear, water-white product.

Another object of the invention is to prepare a clear, water-white polyethylene of increased strength and toughness.

A further object is to prepare an irradiated polyethylene which is clear, transparent and free from gas bubbles.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained and transparent substantially colorless, i. e., water-white, solid polyethylene, can be prepared in a form which can be reproduced, regardless of the subsequent physical change of the polyethylene, by heating the translucent polyethylene until it becomes clear and transparent, i. e., to or beyond its transition point, and then quenching the polyethylene to preserve the clarity. The polyethylene, after quenching, can then be irradiated at any temperature below its transition point to set the clarity against subsequent physical change.

The polyethylene can be heated under atmospheric, superatmospheric or subatmospheric pressure and, after clarity is obtained, preferably immediately thereafter, is chilled rapidly. The chilling is accomplished, for example, in less than 5 seconds, preferably in 2 or 3 seconds or less, and ideally is done instantaneously. The quenching, desirably, is carried to as low as room temperature, or, preferably, even lower, such as the temperature of ice water (about 0° C.), solid carbon dioxide or even liquid air. By quenching is intended rapidly cooling to below the transition point, as just indicated.

Irradiation can be carried out at any convenient temperature below the transition point. Thus, in some instances, temperatures of 100° C., or even slightly above, can be employed. There, likewise, can be used temperatures as low as 0° C. and even lower. The lower temperature limit is that point at which free radicals cannot be formed in significant amounts from the polyethylene. Preferably, room temperature (about 20° C.) is employed.

Irradiation permanently fixes the water-clear transparency in the polyethylene, so that subsequent alterations in physical environment, e. g., heating to the transition point of the polymer before irradiation, and cooling gradually back to room temperature, do not remove the transparent characteristics of the treated polyethylene.

The polyethylene employed should be one which is solid at room temperature and may have a molecular weight of 7,000; 12,000; 19,000; 21,000; 24,000; 30,000; 35,000 or even higher. For many useful results, the molecular weight should be at least 12,000, and preferably, the molecular weight is about 20,000 to 28,000.

It is surprising that irradiation will set or fix the clarity of the polyethylene as set forth herein.

The following examples illustrate typical methods of carrying out the invention.

Example I

Polyethylene, having a molecular weight of about 20,000 (Alathon 14), was heated until clear (about 125° C.) and then passed around a water-cooled drum, maintained at about 10° C., to quench the polyethylene. The quenched product was substantially clear and transparent. Samples of this quenched product, in the form of a sheet one inch long, ⅜" wide and 4 mils thick, were then used in the irradiation step below.

The polyethylene sheet was next subjected to an electron beam at room temperature. The source of the electron beam was a Van de Graaff electrostatic generator, manufactured by the High-Voltage Engineering Corporation, Cambridge, Mass. This machine is a high voltage X-ray generator and was modified by removal of the tungsten target from the path of the electrons to permit thereby irradiation of the objects at the port. The generator was operated at two million volts with an amperage of 41 microamps at the target area per inch of scan. Samples were kept in the target areas for different lengths of time to observe the effect of different amounts of irradiation.

It was observed that a stay of about 2¼ sec. was necessary in order to obtain a product which, upon reheating to the original transition point of the polyethylene and subsequent gradual cooling, would retain a significant amount of the clarity and transparency of the calendered polyethylene. If the period of stay under the electron beam was raised to about 9 seconds, the retention of the transparency upon the subsequent heating and slow cooling was pronounced, while, with a stay of 30 seconds under the electron beam, substantially all of the clarity and transparency of the quenched product were retained. In contrast, a sample of the quenched polyethylene that had not been later irradiated became translucent upon subsequent heating to the transition point and slow cooling to room temperature therefrom.

*Example II*

Polyethylene with a molecular weight of about 20,000 was heated until clear (about 120° C.) and was then plunged into an ice water bath (2° C.). The quenched product was clear and transparent. A square sample of this quenched material, 10 mils thick and one inch square, was subjected to the electron beam, recited in Example I, at room temperature, until it had received a dosage of $20 \times 10^6$ REP. The resulting pellets or squares could be heated to the original transition point of polyethylene and then slowly cooled to room temperature without losing the clarity imparted by the quenching operation. The samples in the examples were positioned to travel forwards and backwards under the irradiation beam. Each passage under the beam took 0.75 second and supplied a dosage of $2 \times 10^6$ REP to the polyethylene.

By slow or gradual cooling is meant that the heated sample is allowed to cool of its own accord by standing in the atmosphere without applying any specific cooling agent thereto.

As previously pointed out, the degree of transparency retained after irradiation and subsequent physical treatments which would normally destroy the transparency imparted, depends entirely upon the irradiation dosage. At a dosage level of $2 \times 10^6$ REP, this increase in retention of transparency first becomes evident to a significant amount. At $6 \times 10^6$ REP, the retention is pronounced. In ascending order of dosage, this retention of transparency is progressively enhanced, being quite good at $20 \times 10^6$ REP, until at $52 \times 10^6$ REP, a mere trace of translucency appears after the subsequent physical treatments. At an even higher dosage, e. g., $100 \times 10^6$ REP, even this trace of translucency does not occur and the irradiated polyethylene retains all the water clarity of the treated product, despite subsequent physical changes. It is advisable that the total amount of irradiation be kept below $200 \times 10^6$ REP for, at this dosage, polyethylene assumes a permanent amber tint.

A REP, as is recognized in the art, is defined as that amount of nuclear radiation which dissipates 93 ergs. of energy per gram of tissue producing $1.61 \times 10^{12}$ ion pairs in the process. It is approximately equal to the amount of energy that would be dissipated by a one roentgen X-ray beam in a gram of tissue.

As the amount of irradiation dosage administered is increased, the polyethylene diminishes in thermoplasticity until finally, transformation is effected into a thermosetting plastic.

The irradiated polyethylene of the present invention can be heat-softened and formed into films or other shapes. The resulting products retain their transparency to a substantial extent even on slow cooling, the amount of transparency retained depending on the irradiation dosage, as previously set forth. Specifically, the irradiated pellets of Example II could be heated to slightly above the transition temperature of the original polyethylene, molded in the form of a cup, e. g., by compression molding, and then gradually cooled to room temperature to give a substantially clear cup.

The degree of cross-linking developed in irradiated polyethylene beyond the $50 \times 15^6$ REP level does not lend itself easily to subsequent working. It is, therefore, desirable to confine transfer, compression, extrusion and injection molding procedures to polyethylene which has been irradiated at dosage levels not over $50 \times 10^6$ REP.

The desired shaping, for example, can be carried out at the original transition temperature of the polyethylene which, of course, is below the softening point of the irradiated product, without loss of clarity. With the treatment of $50 \times 10^6$ REP or above, e. g. $100 \times 10^6$ REP, pressure and vacuum post forming of the polyethylene sheets is still practical as with other types of thermosetting resins.

A dosage of about $50 \times 10^6$ REP to $75 \times 10^6$ REP has been found to be preferred in many instances, since with this dosage, a product is obtained which has excellent fixed clarity or transparency and which can also be subsequently readily molded.

The time of irradiation, while not critical as long as a dosage of sufficient REP is attained, can vary between 0.75 second and 75 seconds, preferably between 7.5 seconds and 45 seconds with the apparatus of Example 1. The voltage can also vary quite widely and can be 750,000 or 1,000,000 or 2,000,000 or 3,000,000 or 6,000,000 volts, or even higher. In any event, the voltage should be sufficiently high to induce the cross-linking necessary to give the desired light transmission. By appropriate combination of time of treatment and voltage, the desired REP dosage can be obtained.

The polyethylene treated by irradiation can have a thickness of 4 mils or less (e. g., 1 mil), up to 50 mils, but is preferably about 1 to 5 mils.

Ozone has an adverse effect upon polyethylene. Consequently, it is frequently desirable to have good ventilation or to carry out the irradiation while the polymer is in an atmosphere of inert gas, such as nitrogen or argon. Thus, the irradiation process of Example II can be carried out while continuously passing a stream of argon over the polyethylene.

It is also sometimes desirable to carry out the irradiation while the polyethylene is maintained in a vacuum, e. g., 1 mm., or less. Thus, the irradiation in Example II can be carried out while the polyethylene is in a vacuum of 0.1 mm. total pressure.

While the irradiation is preferably carried out with electrons, as set forth above, it is also possible to use other means of irradiation. Thus, if the tungsten target is put back, the machine described in Example I will permit X-rays to hit the polyethylene by placing the polymer by the side of the target. However, irradiation with X-rays takes longer than with electrons to obtain the same effect. It is also possible to irradiate with β-rays, e. g., by employing cobalt 60, carbon 14, phosphorus 32, or strontium 90, as a source of irradiation. Gamma-rays can be used, e. g., by submitting the polyethylene to irradiation from iron 59 or cobalt 60. Neutrons, protons, α-particles and deuterons also may be employed to bombard the polyethylene.

Instead of using the Van de Graaff electrostatic generator as the source of the electron beam, other sources of high energy electrons can be employed, such as the General Electric 800,000 volt resonant transformer unit described by Lawton et al. in Industrial and Engineering Chemistry, volume 46, pages 1703 to 1709.

As previously set forth, a process, such as that described in the Lawton article, will not produce a clear polyethylene, as irradiation can only accomplish this result when the polyethylene is transparent at the time of treatment and Lawton treats conventional translucent polyethylene at room temperature.

There can also be employed other conventional apparatus for producing beams of electrons, such as those recited, for example, in Brophy, Patent No. 2,668,133, column 3, lines 5 to 29.

As previously pointed out, for best results, the irradiation dose should be at least about $50 \times 10^6$ REP and the polyethylene should have a molecular weight before irradiation of about 20,000 or above. With polyethylene having a molecular weight of 7,000, it is necessary to employ a dosage of at least $100 \times 10^6$ REP, in order to get satisfactory cross-linking and even higher dosages are necessary for lower molecular weight polymers.

The transparent polyethylene can be formed into valuable products in any of the conventional ways employed with customary translucent polyethylene, such as by making blown films for packaging purposes, vacuum molding, pressure molding, or even by punching articles, e. g., cap liners or ring gaskets, from blanks.

The transparent polyethylene of the present invention can be employed in almost all instances where clear vinyl resins or acrylates and methacrylates are now used. The new polyethylene is of particular advantage, due to its increased strength and resistance to elevated temperature.

Figure 2:
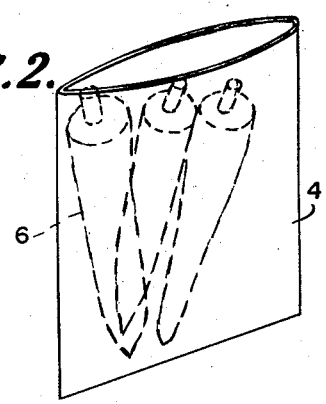
Figure 3:
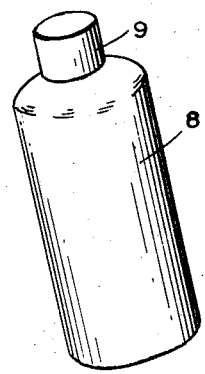
Figure 4:
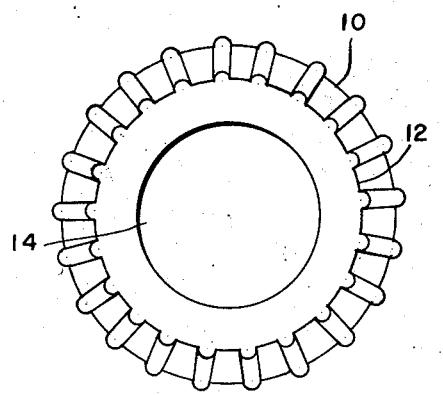
Figure 5:
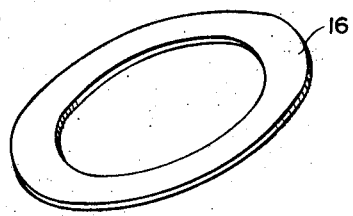

Typical uses for the new transparent polyethylene are disclosed in the drawings, wherein Figure 1 is a perspective view of a box;
Fig. 2 is a perspective view of a flexible bag;
Fig. 3 is a perspective view of a squeeze bottle;
Figure 4 is a bottom view of a crown cap, and
Figure 5 is a perspective view of a ring gasket.

Referring more specifically to the drawings, in Figure 1, there is shown a box 2, made of the transparent polyethylene of the present invention. The box can be used, for example, as a silverware container.

In Figure 2, there is shown a flexible bag 4, made of transparent polyethylene. Such bags are particularly desirable for displaying food products, designated generically at 6, in grocery stores, as the customer desires to see the product before buying. Thus, there can be packaged vegetables, such as carrots and lettuce, or meats, such as turkey, or candies or even ice cream.

The transparent polyethylene also can be used to replace the conventional translucent polyethylene in making a squeeze bottle 8 and cap 9 with enhanced esthetic values. Such bottles also can be used in place of tin cans or glass jars. If desired, although this is not ordinarily preferred, the transparent polyethylene can be tinted with organic dyestuffs to give colored bottles, and other products, which retain their transparent characteristics.

The transparent polyethylene also can be molded into cap liners, such as the liner 12 in crown cap 10. It is possible to provide such liners with a central recess, as shown at 14. In addition, the transparent polyethylene can be formed into a ring gasket 16.

It is also possible to sterilize articles packaged in transparent polyethylene containers, such as the bag 4 and the bottle 8, by submitting the package to heat sterilization, e. g., a bottle, formed from polyethylene having a thickness of 45 mils, could have the articles therein sterilized by submitting the package to a temperature of 58 to 60° C. for 24 hours. Also higher temperatures can be employed for shorter periods of time, e. g., 110° C. for 5 minutes on three consecutive days to kill spores.

The transparent polyethlene is especially desirable for use as liners with caps for wide-mouthed containers, as the interior of the cap may be decorated and observed through the liner because of the transparency of the latter. The new polyethylene of the present invention can also be used in coatings and other coverings.

The uses recited above are not exhaustive, but are illustrative only and in no way limit the invention.

We claim:

1. A process comprising heating polyethylene until it becomes clear and transparent, then quenching the polyethylene to preserve the clarity and thereafter irradiating said polyethylene at a dosage of at least about $2 \times 10^6$ REP while in the clear condition and below the transition point until the transparency is at least partially set against subsequent heating to the transition point and slow cooling.

2. Polyethylene of increased permanent clarity made by the process of claim 1.

3. A process according to claim 1, wherein the irradiation dosage is between about $2 \times 10^6$ and $100 \times 10^6$ REP.

4. A process according to claim 3, wherein the irradiation is carried out with electrons at a dosage between about $20 \times 10^6$ and $75 \times 10^6$ REP.

5. A process according to claim 4, wherein the dosage is about $50 \times 10^6$ to $75 \times 10^6$ REP.

6. A process according to claim 1, wherein the polyethylene is heated to at least its transparent point and is quenched to at least about room temperature and the irradiation is carried out with electrons at a dosage between about $2 \times 10^6$ and $100 \times 10^6$ REP.

7. A process according to claim 6, wherein the polyethylene has a molecular weight of at least about 12,000.

8. A process according to claim 7, wherein the polyethylene has a molecular weight about 20,000.

9. A process according to claim 8, wherein the polyethylene subjected to irradiation has a thickness of about 1 to 5 mils.

10. A process according to claim 1, wherein the quenching is done to at least about 0° C.

11. A process according to claim 10, wherein the irradiation dosage is between about $50 \times 10^6$ and $75 \times 10^6$ REP.

12. A process comprising heating polyethylene until it becomes clear and transparent, then quenching the polyethylene to preserve the clarity and thereafter irradiating the polyethylene with electrons at a dosage of at least about $2 \times 10^6$ REP while in the clear condition and below the transition point whereby the transparency is at least partially set against subsequent heating to the transition point and slow cooling.

References Cited in the file of this patent

UNITED STATES PATENTS

| | | |
|---|---|---|
| 2,437,914 | Frondel | Mar. 16, 1948 |
| 2,702,863 | Koch | Feb. 22, 1955 |

OTHER REFERENCES

"Effect of Gamma Radiation on Certain Rubbers and Plastics," by John W. Ryan, from Nucleonics, August 1953, pp. 13–15.